United States Patent [19]
Reuter et al.

[11] Patent Number: 5,906,849
[45] Date of Patent: May 25, 1999

[54] COMPOSITION FOR PRESERVING FODDER MATERIALS, A METHOD OF PREPARING IT AND ITS USES

[75] Inventors: Burkhard Reuter, Straelen; Bernd Kochannek, Meckenheim, both of Germany

[73] Assignee: Addcon Agrar GmbH, Bergheim, Germany

[21] Appl. No.: 08/839,233

[22] Filed: Apr. 24, 1997

[30] Foreign Application Priority Data

Apr. 25, 1996 [DE] Germany .......................... 196 16 462

[51] Int. Cl.$^6$ ....................................................... A23K 3/03
[52] U.S. Cl. .......................... 426/335; 426/807; 252/384
[58] Field of Search .................................... 426/335, 807; 252/384

[56] References Cited

U.S. PATENT DOCUMENTS 3,600,198  8/1971  Gonthier et al. .......................... 99/158

FOREIGN PATENT DOCUMENTS 1697296   8/1991  U.S.S.R. .
2 095 534 10/1982  United Kingdom .
9316603   9/1993  WIPO .
93/16611  9/1993  WIPO .

*Primary Examiner*—Chhaya D. Sayala
*Attorney, Agent, or Firm*—Merchant, Gould, Smith, Edell, Welter & Schmidt

[57] ABSTRACT

A composition for preserving fodder material,
  a) 5–41% by weight alkali and/or alkaline earth metal salts of benzoic acid, calculated as sodium salts in each case,
  b) 1–14% by weight alkali and/or alkaline earth metal salts of $C_1$–$C_3$ carboxylic acids, calculated as sodium salts in each case,
  c) 10 to <59% by weight propionic acid, calculated as pure propionic acid, and
  d) >30–<80% by weight water, wherein the total amount of all the components a) to d) is 100% by weight, and the sum of b) and c) is less than 60% by weight, and wherein all % by weight are given with respect to the total amount of all the components a) to d), and a method of preparing the composition and its use for preserving fodder materials are described.

11 Claims, No Drawings

COMPOSITION FOR PRESERVING FODDER MATERIALS, A METHOD OF PREPARING IT AND ITS USES

The present invention relates to a composition for preserving fodder materials, containing alkali and/or alkaline earth metal salts of benzoic acid, alkali and/or alkaline earth metal salts of $C_1$–$C_3$ carboxylic acids, propionic acid and water, and also relates to a method of preparing the composition and to its use for preserving fodder materials.

Fodder materials are rendered durable, i.e. preserved, when their water content is so low that silage making or acid fermentation cannot take place or is not to be carried out. The object of preservation is to protect the fodder material against infection by mould fungi, bacteria and yeasts. Protection against mould fungi is particularly important, since these form mycotoxins, such as aflatoxin for example, which are poisonous to animals fed with the fodder, and are also poisonous to consumers of meat in the further course of the food chain.

Pure propionic acid has mainly been used hitherto as the preservative for preventing fodder materials from becoming mouldy. The dosage used is relatively high (3–20 l/t, depending on the moisture content). However, propionic acid is aggressive and exhibits a strong etching effect, and therefore causes corrosion problems. Moreover, propionic acid has a high vapour pressure, which gives rise to a considerable odour nuisance and to hazards due to the occurrence of overpressure during the handing of containers.

The use of the less corrosive neutral salts (propionates) for preserving fodder is known, but is not suitable for non-fermenting substrates.

Benzoic acid exhibits a much stronger fungicidal effect than that of propionic acid. Benzoic acid is not soluble in water, however, and can therefore only be applied as a solid. It is therefore not suitable for relatively dry fodder material. The salts of benzoic acid are more readily soluble than the acid itself, but are likewise scarcely effective in non-fermenting substrates, since their action is strongly pH-dependent.

Sodium benzoate and other alkali and alkaline earth metal benzoates are used to a considerable extent as silage making agents. In particular, green fodder and also grain with a high moisture content are subjected to fermentation with the use of benzoates. Benzoates or benzoic acid have not hitherto been used as preservatives for non-fermenting fodder material.

WO 93/16611 describes a liquid preservative composition for the preservation of green fodder which contains, as its active ingredient, benzoic acid or a derivative thereof, as well as propionic acid in admixture with formic acid and/or acetic acid. The composition described contains 60–95% by weight of a mixture of propionic acid and formic acid, propionic acid and acetic acid, or propionic acid, formic acid and acetic acid, as well as 5–25% by weight of benzoic acid or salts thereof and optionally aliphatic $C_4$–$C_{10}$ monocarboxylic acids or esters thereof, or $C_{10}$–$C_{20}$ fatty acids of derivatives thereof, alcohols, polyalcohols and/or thickeners, and optionally up to 30% by weight of water. This composition is also strongly corrosive, due to its high content of organic $C_1$–$C_3$ acids. A high content of formic acid is emphasised as being particularly advantageous. It is known that benzoic acid is readily soluble in admixture with a high acid content such as this. Only at acid contents less than 60% by weight does slight precipitation occur. Formic acid and acetic acid on their own exhibit scarcely any fungicidal effect.

SU-1697296 describes an additive for fodder preservation, consisting of 9.5–16.0% by weight sodium benzoate, 25.5–39.0% by weight of "water of reaction", which contains, amongst other constituents, formic acid, acetic acid, benzoic acid, formaldehyde, alcohols, $C_4$–$C_{20}$ fatty acids or esters thereof, traces of heavy metals and water, as well as 55–65% by weight propionic acid. This composition is also very corrosive, due to its high content of propionic acid.

U.S. Pat. No. 3,600,198 discloses a composition for preserving fish, which consists of a buffered solution of propionic acid and sodium propionate in admixture with a buffered solution of benzoic acid and benzoate with a pH less than 7 in water, wherein the water content is 80–99.5% by weight with respect to the total solution. A fish substrate has a high content of water and protein, and different processes of decomposition occur compared with fodder materials. The bacterial decomposition of proteins is the main process occurring in fish. This composition is therefore not suitable for preserving fodder materials.

GB-A-2 095 534 describes a composition for preserving green fodder, which contains a pH-lowering constituent and benzoic acid or benzoate. Formic acid or hydrochloric acid is cited as the pH-lowering constituent. Water is not disclosed as a solvent for the composition. The composition is preferably produced as a suspension which is as homogeneous as possible, with the use of thickeners and gelling agents.

The object of the present invention is to provide a composition for preserving fodder materials which exhibits an improved effect against mould fungi, yeasts and bacteria, and which is less corrosive than customary preservatives for fodder materials.

It has surprisingly been shown that by the combined use of benzoic acid or benzoate, salts of $C_1$–$C_3$ carboxylic acids and propionic acid in a highly concentrated solution a surprisingly good effect can be achieved against mould fungi, yeasts and bacteria for the preservation of fodder materials.

As is known, benzoic acid is very difficultly soluble in water. When a dilute solution of sodium benzoate is mixed with propionic acid the benzoic acid usually precipitates out. It has now been found that a solution which comprises high concentrations of benzoate and propionic acid can be obtained in a defined manner. This solution is highly effective for the preservation of fodder materials and has a low volume compared with customary preservative solutions, which simplifies handling and transport and makes them less expensive.

The aforementioned object is achieved by a composition for preserving fodder materials, comprising
  a) 5–41% by weight alkali and/or alkaline earth metal salts of benzoic acid, calculated as sodium salts in each case,
  b) 1–14% by weight alkali and/or alkaline earth met( salts of $C_1$–$C_3$ carboxylic acids, calculated as sodium salts in each case,
  c) 10–<59% by weight propionic acid, calculated as pure propionic acid, and
  d) >30–<80% by weight water, wherein the total amount of all the components a) to d) is 100% by weight, and the sum of b) and c) is less than 60% by weight, and wherein all the data in % by weight are given with respect to the total amount of all the components a) to d).

A preferred embodiment of the composition comprises
  a) 13–30% by weight alkali and/or alkaline earth metal salts of benzoic acid, calculated as sodium salts in each case, b) 3–7% by weight alkali and/or alkaline earth metal salts of $C_1$–$C_3$ carboxylic acids, calculated as sodium salts in each case, c) 34–53% by weight propionic acid, and d) 25–55% by weight water, wherein the total amount of all the components a) to d) is 100% by weight, and the sum of b) and c) is less than 60% by weight, and wherein all the data in % by weight are given with respect to the total amount of all the components a) to d).

A particularly preferred embodiment comprises a) 13–18% by weight sodium benzoate, b) 3–7% by weight sodium propionate, c) 37–50% by weight propionic acid, and d) 45–52% by weight water.

The solution according to the invention is prepared by a method characterised in that i) an aqueous solution is prepared with d) a water content of >30–<80% by weight, which comprises a) 5–41% by weight alkali and/or alkaline earth metal salts of benzoic acid and b) 1–14% by weight alkali and/or alkaline earth metal salts of $C_1$–$C_3$ carboxylic acids, calculated as sodium salts in each case, and ii) this mixture is added, with mixing, to c) 10–59% by weight propionic acid, wherein the total amount of all the components a) to d) is 100% by weight, and the sum of b) and c) is less than 60% by weight, and wherein all the data in % by weight are given with respect to the total amount of all the components a) to d).

In a preferred embodiment of the method according to the invention, salt solution i) and concentrated propionic acid ii) are used in a volume ratio of 90:10 to 50:50, preferably in a volume ratio of 60:40.

In a preferred embodiment of the method according to the invention, an aqueous solution comprising 261 g sodium benzoate and 95 g sodium propionate per 1000 ml water is added to concentrated propionic acid, wherein 60% by volume of the aqueous solution and 40% by volume of propionic acid are used, with respect to the total amount of the two solutions in each case.

The present invention further relates to the use of the claimed composition for the preservation of fodder materials.

The composition according to the invention is suitable for the preservation of grain or for the preservation of dry fodder materials such as hay, for example. Substrates such as these are usually stored with residual moisture contents of less than 25%. In this situation, no fermentation (silage formation) occurs. At residual moisture contents greater than 14%, fodder materials such as these are subject to spoilage due to mould formation.

The present invention is based on the fact that stable propionic acid/benzoate solutions which have a propionic acid content of less than 59% by weight can only be obtained by the use of substantially saturated aqueous benzoate solutions. In turn, the stability of these mixtures is only ensured when the aqueous benzoate solution contains the aforementioned amounts of alkali and/or alkaline earth metal salts of $C_1$–$C_3$ carboxylic acids and benzoate.

If the overall composition contains more than 41% benzoate, precipitation occurs. At a benzoate content less than 5% by weight, a satisfactory preservation effect cannot be achieved.

The effect of the composition is not improved by the use of more than 14% by weight $C_1$–$C_3$ salts, whilst precipitation occurs when less than 1% by weight is used.

No improvement in the preservation effect and in the properties of the product compared with concentrated propionic acid can be identified if a propionic acid content of >59% is exceeded. If the content falls below 10% propionic acid, precipitation of the dissolved components of the mixture occurs.

If the overall composition contains less than 30% water, precipitation occurs, and corrosion problems may arise due to the larger amount of propionic acid. Exceeding a water content of >80% results in precipitation of benzoic acid on contact with the propionic acid.

Sodium, potassium, caesium, lithium, magnesium, calcium, barium and ammonium salts are suitable as alkali or alkaline earth metal salts of benzoic acid. Sodium benzoate and ammonium benzoate are preferably used, since these salts are readily soluble in water.

The sodium, lithium, potassium, caesium, magnesium, calcium, barium and ammonium salts of propionic acid, acetic acid and formic acid are suitable as the alkali or alkaline earth metal salts of $C_1$–$C_3$ carboxylic acids.

Sodium salts of the said acids are preferred. Alkali or alkaline earth metal salts of higher carboxylic acids are not suitable for the composition according to the invention, since even the $C_4$ acid cannot be used for the preservation of fodder due to its severe odour nuisance.

The quoted amounts of benzoate and salts of $C_1$–$C_3$ acids are given calculated as sodium salts. Propionate, formate and acetate are determined as the acid from measurements in weakly acidic solution, by gas chromatographic acid analysis; the salt content can subsequently be calculated by way of the sodium determination. The aforementioned data for sodium salts can be converted into the corresponding contents calculated as acids. For example, 5–41% by weight sodium benzoate corresponds to 4.2–34.7% by weight benzoic acid. 1–14% by weight of sodium $C_1$–$C_3$ salts corresponds to 0.8–10.8% by weight propionic acid, 0.7–9.5% by weight formic acid, or 0.7–10.2% by weight acetic acid.

The concentrated propionic acid is normal commercial 99% propionic acid. Industrial fodder material quality is preferably used. The water is conventional mains water.

All non-fermenting fodder materials are suitable as the fodder materials to be preserved, particularly grain, fodder grain, moist grain with a moisture content of more than 14%, hay, semi-dried hay, granular corn, corn products such as shredded corn grains, and industrial mixed fodder (containing leguminous plants, soya, sugar beet slices, grain and other constituents).

The moisture content is understood to be the loss on drying or weight loss at temperatures of 60–105° C. Fodder materials with a residual moisture content >14% cannot be stored. Preservation by fermentation or acid fermentation is only possible at moisture contents >35%.

The compositions according to the invention have pH values higher than 4.8. They are therefore considerably less acidic than the aforementioned compositions with acid contents of 60–96% by weight, the pH of which is in the range from 2 to 4. The claimed mixture is therefore considerably less corrosive and has less of an etching effect than the known mixtures with a high acid content.

It was possible to show by the examples described below that a surprising synergistic effect is achieved with the claimed composition as regards the action on mould fungi. Although amounts used fell below the recommended dosage amount for pure propionic acid by up to 60%, and the amount of sodium benzoate used was far below the minimum inhibiting concentration which is known for mould fungi (2000–5000 ppm at pH 5 according to Lück, 1995), the claimed composition exhibits an inhibiting effect on the formation of mould fungi which is comparable with or better than the effect obtained with pure propionic acid. It was also possible to show by the examples described below that the addition of the propionic acid component on its own in an amount of 2–4 l/t did not result in a satisfactory fungicidal effect, but that a satisfactory effect was only achieved by the combination of propionic acid with the benzoate-propionate mixture.

The composition according to the invention is prepared in two steps. A salt solution is first prepared which contains alkali or alkaline earth metal salts of benzoic acid and $C_1$–$C_3$ carboxylic acids. This is then added to concentrated propionic acid. This sequence of addition cannot be changed. The acid must be placed in the mixing vessel first, since otherwise the salts would immediately precipitate.

The salt solution preferably contains 261 g sodium benzoate (corresponding to 222 g benzoic acid), i.e. 23% by weight sodium benzoate, and 95 g sodium propionate (corresponding to 73 g propionic acid), i.e. 8.4% by weight sodium propionate. The density of this salt solution is about 1.133 kg/l. The water content of this preferred salt solution is about 68% by weight.

The mixture ratio of the salt solution to propionic acid is 90:10 to 50:50 by volume, wherein 60:40 is preferred. This means that the salt solution, which contains benzoate and propionate, is preferably mixed with concentrated propionic acid in a ratio of 3:2, wherein the aforementioned sequence of addition must be adhered to. In the course of this procedure, the salt solution is slowly added to the propionic acid, with mixing being effected by stirring for example. The best dosage effect at the lowest propionic acid content is obtained at a mixture ratio of 60:40.

The solution obtained in this manner is ready for use and contains about 16% by weight sodium benzoate, about 6% by weight sodium propionate, about 40% by weight propionic acid and about 40% by weight water, and is not mixed with other constituents or further diluted by the user. Additional benzoic acid can in fact be added without benzoate precipitating, but a high propionic acid concentration in the solution which is used should be avoided in particular. It is possible to make a further addition of sodium benzoate to the final solution, up to a total concentration of 30% by weight sodium benzoate. However, higher benzoate concentrations do not result in the composition having an enhanced effect on the preservation of fodder materials. The solution cannot be mixed with water. When water is added, precipitation occurs immediately.

The clear, stable solution prepared according to the invention can be distributed in the fodder using any customary technique for dosing with liquids.

The invention is described in more detail below by means of examples.

EXAMPLE 1

Three different salt solutions were prepared, with the following compositions:

A: 261 g sodium benzoate/liter

B: 356 g sodium benzoate/liter

C: 261 g sodium benzoate and 95 g sodium propionate/liter.

Each of these salt solutions was mixed with concentrated propionic acid in a 50:50 mixture ratio (by volume). Precipitation occurred when solutions A and B were used, whilst a clear solution was obtained when solution C according to the invention was used. Mixture C obtained from salt solution C and propionic acid in a 50:50 ratio contained 49.5% by weight propionic acid, 13.1% by weight sodium benzoate and 4.8% by weight sodium propionate. The clear solution comprising propionic acid and salt solution could be concentrated to a benzoate content of 30% by weight by a further addition of sodium benzoate. The solution then contained 30% by weight sodium benzoate, 37.9% by weight propionic acid and 3.6% by weight sodium propionate.

EXAMPLE 2

Salts solutions A, B and C from Example 1 were each mixed with concentrated propionic acid in a 60:40 ratio. The salt solution was slowly added to the concentrated propionic acid with mixing in each case. The overall solution obtained from salt solution A and salt solution B exhibited immediate precipitation, whereas the solution obtained from salt solution C and propionic acid remained clear. The clear solution obtained by mixing propionic acid with salt solution C contained 39.6% by weight propionic acid, 15.7% by weight sodium benzoate and 5.7% by weight sodium propionate. This solution could be concentrated to a benzoate content of 30% by weight by the further addition of sodium benzoate. This solution then contained 30% by weight sodium benzoate, 34.4% by weight propionic acid and 4.9% by weight sodium propionate.

EXAMPLE 3

The following example shows the efficacy of a mixture according to the invention for the preservation of grain and of dry fodder materials. Hitherto, propionic acid (99%) was used exclusively for the preservation of fodder materials such as these.

Recommended dosage (BASF) as a function of moisture content when storing for 3 to 6 months

| Moisture content | Storage (l/tonne) |
| --- | --- |
| 16 | 5.0 |
| 20 | 6.5 |
| 26 | 9.5 |

These proportions are minimum amounts. Any dosage which falls below the recommended dose involves the risk of ineffectiveness or of the selective growth of mould, since propionic acid can also promote the growth of bacteria, yeasts and mould fungi.

The following example therefore shows that it is possible partially to replace the requisite amount of propionic acid by a substance with a reliable fungicidal effect, such as sodium benzoate for example.

Barley was stored as moist grain under aerobic conditions, with the addition of a) 99% propionic acid, or b) the mixture comprising propionic acid:salt solution according to the invention (261 g sodium benzoate and 95 g sodium propionate per liter of salt solution) in a 40:60 mixture ratio (corresponding to a mixture of salt solution C and propionic acid from Example 2).

Grain with a moisture content of A) 17.8% and B) 21.5% was used.

The rate of infection IR (%) was determined by the method of M. Kwella and F. Weissbach, Zbl. Mikrobiol. 139 (1984), 453–462. The rate of infection IR (%) is a measure of the percentage number of cereal grains tested which are attacked by storage fungi (mould). In the course of this determination, a distinction is also made between types of mould fungi, so that rates of infection of more than 100% are possible if a plurality of types of mould have become colonised on a cereal grain.

The results of the tests are presented in the following Table.

| Duration of storage | | A addition of/ without a | | | b | | B addition of/ without a | | | b | |
|---|---|---|---|---|---|---|---|---|---|---|---|
| (weeks) | (l/t) | 0 | 5 | 10 | 5 | 10 | 0 | 5 | 10 | 5 | 10 |
| | | (IR (% infection by storage fungi)) | | | | | | | | | |
| 1 | | 0 | 0 | 0 | 0 | 0 | 52 | 0 | 0 | 0 | 0 |
| 4 | | 87 | 1 | 0 | 0 | 0 | 113 | 0 | 0 | 0 | 0 |
| 8 | | 99 | 0 | 0 | 0 | 0 | 112 | 0 | 0 | 0 | 0 |
| 12 | | 101 | 0 | 0 | 0 | 0 | 137 | 0 | 0 | 0 | 0 |

All the stored samples were also free from mould when variant b) of the composition according to the invention was added, even though the dose added fell below the requisite dose of propionic acid for reliable preservation by up to 60%. The amount of sodium benzoate (480–960 ppm) applied with variant b) of the mixture according to the invention was far below the known minimum concentration for the inhibition of mould fungi (2000–5000 ppm at pH 5 according to Lück, 1971). The combined action which can be identified from this shows the synergistic effect of propionate and benzoic acid, and has not hitherto been described in the literature.

EXAMPLE 4

Barley was stored as moist grain with a moisture content of 21.5%, under aerobic conditions. The following were used as additives:

a) 2 l/t 99% propionic acid, or
b) 5 l/t of the composition according to the invention (propionic acid:salt solution (262 g sodium benzoate and 95 g sodium propionate per liter of salt solution) in a 40:60 mixture ratio) corresponding to mixture C from Example 2. The rate of infection was determined as in Example 3. The results are presented in the following Table.

| Duration of storage (weeks) | Addition of/ without | a | b |
|---|---|---|---|
| | (IR (% infection by storage fungi)) | | |
| 3 | 98 | 98 | 0 |

It clearly follows from the Table that the addition of the propionic acid component on its own in an amount of 2 l/t does not result in a satisfactory effect. In this dosage range, an infection-inhibiting effect is only obtained by the combination of propionic acid with the benzoate-propionate mixture corresponding to the composition according to the invention.

We claim:

1. A composition for preserving fodder materials, comprising: an aqueous solution of
    a) 5–41% by weight alkali and/or alkaline earth metal salts of benzoic acid, calculated as sodium salts in each case,
    b) 1–14% by weight alkali and/or alkali earth metal salts of $C_1$–$C_3$ carboxylic acids, calculated as sodium salts in each case,
    c) from about 10 to less than about 59% by weight propionic acid, calculated as pure propionic acid, and
    d) from more than about 30 to less than about 80% by weight water, wherein the aqueous solution is prepared by adding a mixture of a), b), and d) to c), and wherein the total amount of all components a) to d) is 100% by weight, and the sum of b) and c) is less than 60% by weight, and wherein all the weight percentages are given with respect to the total amount of all the components a) to d).

2. A composition according to claim 1, comprising
    a) 13–30% by weight alkali and/or alkaline earth metal salts of benzoic acid, calculated as sodium salts in each case,
    b) 3–7% by weight alkali and/or alkaline earth metal salts of $C_1$–$C_3$ carboxylic acids, calculated as sodium salts in each case,
    c) 34–53% by weight propionic acid, and
    d) 25–55% by weight water.

3. A composition according to claim 1, comprising
    a) 13–18% by weight sodium benzoate,
    b) 3–7% by weight sodium propionate,
    c) 37–50% by weight propionic acid,
    d) 45–52% by weight water.

4. A composition according to claim 1, wherein the composition is a clear solution.

5. A method of preparing a composition for preserving fodder materials, comprising:
    i) preparing an aqueous solution of d) a water content of from more than about 30 to less than about 80% by weight, a) 5–41% by weight alkali and/or alkaline earth metal salts of benzoic acid and b) 1–14% by weight alkali and/or alkaline earth metal salts of $C_1$–$C_3$ carboxylic acids, calculated as sodium salts in each case, and adding the aqueous solution to c) 10–59% by weight propionic acid, wherein the total amount of all components a) to d) is 100% by weight, and the sum of b) and c) is less than 60% by weight, and wherein all the weight percentages are given with respect to the total amount of all the components a) to d).

6. A method according to claim 5, wherein the ratio of aqueous solution to concentrated propionic acid is 90:10 to 50:50 by volume.

7. A method for preserving fodder material comprising combining the fodder material with a composition of claim 1.

8. A method according to claim 7, wherein the fodder material is selected from the group consisting of non-fermenting fodder, fodder grain, moist grain with a moisture content of more than 14%, hay, semi-dried hay, granular corn, corn products, shredded corn grains, and industrial mixed fodder.

9. A method according to claim 7, wherein the fodder material is protected against mould fungi, bacteria and yeasts.

10. A method according to claim 7, wherein 2–10 L of the composition of claim 1 is used per tonne of fodder material.

11. A method according to claim 10 wherein about 5 L of the composition is used.

* * * * *